Figure 1:
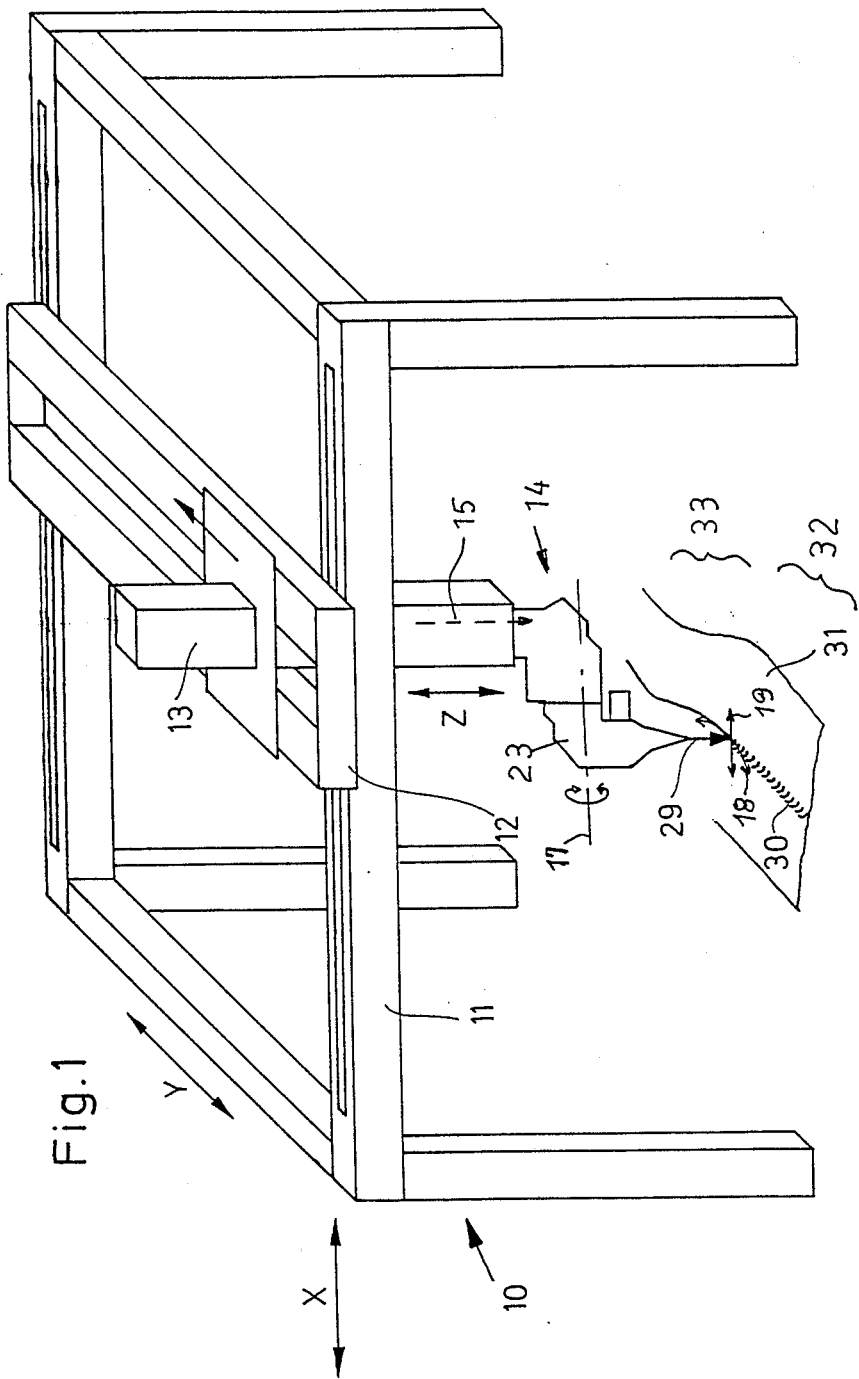

United States Patent [19]

Bickel et al.

[11] Patent Number: 4,825,036
[45] Date of Patent: Apr. 25, 1989

[54] DEVICE FOR DIRECTING OPTICAL RAYS

[75] Inventors: Martin Bickel, Munich; Albrecht Baum, Dachau, both of Fed. Rep. of Germany

[73] Assignee: MAN Technologie GmbH, Munich, Fed. Rep. of Germany

[21] Appl. No.: 176,441

[22] Filed: Apr. 1, 1988

[30] Foreign Application Priority Data

Apr. 2, 1987 [DE] Fed. Rep. of Germany ....... 3711088
Mar. 8, 1988 [DE] Fed. Rep. of Germany ....... 3807471

[51] Int. Cl.4 ............................................. B23K 26/08
[52] U.S. Cl. ......................... 219/121.78; 219/121.63; 219/121.67; 219/121.80
[58] Field of Search ...................... 129/121.78, 121.79, 129/121.8, 121.63, 121.64, 121.67, 121.72, 121.74, 121.75

[56] References Cited

U.S. PATENT DOCUMENTS 4,144,888 3/1979 Malyshev et al. .......... 219/121.79 X
4,638,143 1/1987 Akeel ......................... 219/121.79 X
4,694,139 9/1987 Röder ......................... 219/121.74 X Primary Examiner—C. L. Albritton
Attorney, Agent, or Firm—Scully, Scott, Murphy & Presser

[57] ABSTRACT

In the context of a device for directing optical rays along a given path comprising a ray deflecting means there is a pivoting ray exit member, which simultaneously pivotally entrains the deflecting mirror and is arranged to pivot with the mirror about a third axis. The ray exit member is able to pivot about a first axis and the mirror pivots about a second axis and both are mounted on a rotary housing. The first and the second axes are parallel to each other and are located in the reflecting surface of the mirror. By means of a threaded rod and a return spring the ray exit member is turned and its pivoting motion is transmitted via an abutment to the mirror. The distance of the abutment from the first axis is half the size of the distance from the second axis in order thus to pivot the mirror through an angle which is half as large as the pivotal sweep of the ray exit member with the result that the central ray setting in the small exit opening is adhered to. This pivotal motion serves to correct the position when moving the ray along a given line. If the line onto which the ray is to be directed is curved in three dimensions the ray exit member is so swept with the mirror around the third axis that the ray is also kept perpendicular to the point at which the ray is to be directed.

8 Claims, 3 Drawing Sheets

DEVICE FOR DIRECTING OPTICAL RAYS

BACKGROUND OF THE INVENTION

The present invention relates to a device for directing optical rays comprising at least one deflecting mirror and a ray exit member adjoining it, said member being able to be pivoted around two axes which are perpendicular to each other, one pivot axis being parallel to the ray incident to the mirror or coinciding with such ray and the second pivot axis being perpendicular thereto.

Devices of this type serve to direct a ray along given areas of a component, more especially for machining workpieces with laser rays, as for example in welding, hardening, cutting etc. The device is then so arranged in relation to a machining table that relative motion in three dimensions is possible between the device and the table.

The German patent No. 3,530,189 describes a device of this type which has a number of articulated arms each provided with a deflecting mirror. Each articulated arm is able to be turned about an axis which coincides with the respective incident ray so that the last link serving as the ray exit member, and therefore the output ray, is able to be pivoted in one direction. The focal point of the emerging ray may then describe a circle or be moved along a tangent thereto. In a welding operation, for example, the weld seam is produced under the emerging ray perpendicular to the direction of pivoting. A correction in position is carried out with the pivoting motion of the ray exit member.

This procedure is used for machining flat workpieces. If a curved piece of work is to be welded or cut, the holding means is then so pivoted together with the component that the ray is always perpendicular to the unit of surface on which the ray is incident. This requires complex mechanisms, which in addition to the linear motion in one plane also involve pivoting motion either of the work table or of the ray directing mechanism. Furthermore it is no longer possible to ensure a precise control of the ray's point of incidence.

SHORT SUMMARY OF THE INVENTION

One object of the present invention is to provide a device of the initially mentioned type which is simple to manufacture.

A further aim of the invention is to allow precise and rapid control of the ray even in the case of components with curved surfaces.

In order to achieve these or other objects appearing herein the device is so designed that the second pivot axis is in the central position of the ray exit member in the reflection surface of the mirror and the mirror is arranged so that it may be pivoted about a third axis with half the pivot angle of the ray exit member, such third axis being parallel to the second pivot axis.

The mechanism in accordance with the invention makes it possible to pivot the exit ray in two direction which are perpendicular to each other, the ray being able to be set perpendicularly to the workpiece surface with the one direction of pivot, while the second direction of pivot is always available for positioning the ray in a direction perpendicular to the direction along which it is being moved or directed. Thus there is no need for moving means in the case of which the complete workpiece or the complete ray device, that is to say large masses would have to be pivoted.

With the device in accordance with the invention there is only a three dimensional, linear mobility without pivoting motion of the ray producing means of the workpiece holder being required. For directing the ray in order to correct its position and to keep to the perpendicular alignment of the ray in relation to the surface of the workpiece it is only necessary to move the relatively small ray exit member so that furthermore there is a rapid and precise positioning of the ray and a continuous control thereof along a line which is curved in the plane or in three dimensions.

The U.S. Pat. No. 4,396,285 refers to a system in which a ray as reflected by a mirror is to be positioned by pivoting of the mirror, although this is done by hand. And furthermore it is not indicated how the mirror is to be moved in order to cause the pivot motion. This known device is furthermore not suitable for use in a system of the generic type in question here, since the pivot angle for the ray would be very considerably limited by an exit window of the protective housing required.

On the other hand in the device in accordance with the invention the pivotability is unlimited, at least in one direction. The ray exit member may in fact be turned around he first axis in the incident lay through 360° so that the device in accordance with the invention is also suitable to carry out machining along a peripheral line within a tube. The limited pivotability in the direction perpendicular to this is to enable correction of position to be performed, something that in any case only involves a small pivot angle.

In a simple form of the invention the third pivot axis is also provided in the plane of reflection of the mirror, that is to say on the edge of the mirror or clear of the edge, this making it technically simple to implement the pivoting system for supporting the mirror.

Such a means for mounting the mirror furthermore makes possible a simple construction for ensuring coordinated pivoting be ween the ray exit member and the mirror since the motion of the ray exit member is transmitted via an abutment. The abutment in this respect only requires to be so selected that it comes to take up a position in the plane of the pivot axis of the mirror and of the second pivot axis of the ray exit member and is arranged at the same distance from the second pivot axis of the ray exit member, as is also the case with the pivot axis of the mirror in relation to the second pivot axis of the ray exit member. When the ray exit member is pivoted the mirror is automatically pivoted with it through half the angle thereof.

The mobility of the system is thus made possible using only means which are simple to manufacture. For the pivoting motion around the first axis a conventional rotary bearing is used, in the case of which the ray exit member, the mirror and possibly a drive for the pivoting motion may be turned as a single unit together around the ray incident on the mirror.

The design of the device in accordance with the invention involves the further advantage that the automatic control of the ray along a track is able to be implemented precisely and with means that are extremely simple to manufacture.

For the pivoting motion around the second axis it is in fact possible to employ a threaded rod which is so arranged that the motion of the rod is able to exert a force against the ray exit member in the plane of pivoting and direction of pivoting. The position at which the force acts is in this respect preferably to be arranged as near as possible to the ray exit end, this improving the accuracy of positioning, same ultimately only depending on the precision of the threaded rod.

In order to move the nozzle member only into a defined state of engagement with the threaded rod, it is pressed by means of a return spring attached to the housing of the device against the abutment of the threaded rod.

The mirror to be pivoted as well is attached by a leaf spring on the housing of the device. Furthermore, the leaf spring has a free intermediate part as the pivot axis and provides for an additional returning force. Gravity serves to provide for engagement of the mirror on the ray exit member in an approximately vertical setting of the emerging ray. In the case of the use of the device for machining workpieces when a large pivot or turning angle around the first axis is needed there will be the necessity of providing for an additional returning force for the mirror, as for instance such a force provided by a compression or tension spring.

The pivot motion of the mirror is exerted directly by the ray exit accurate pivoting therewith of the mirror then taking place so that thus exact focussing of the ray is maintained.

The transmission of force between the ray exit member and the mirror takes place at a distance from the axis of turning of the ray exit member, which is equal to the distance between the two pivot axes. Thus the mirror is in every case caused to move as well through half the angle of pivot so that the reflected rays are always incident in the nozzle member.

One working embodiment of the invention is diagrammatically shown in the figures.

LIST OF THE SEVERAL VIEWS OF THE DRAWING

Figure 2:
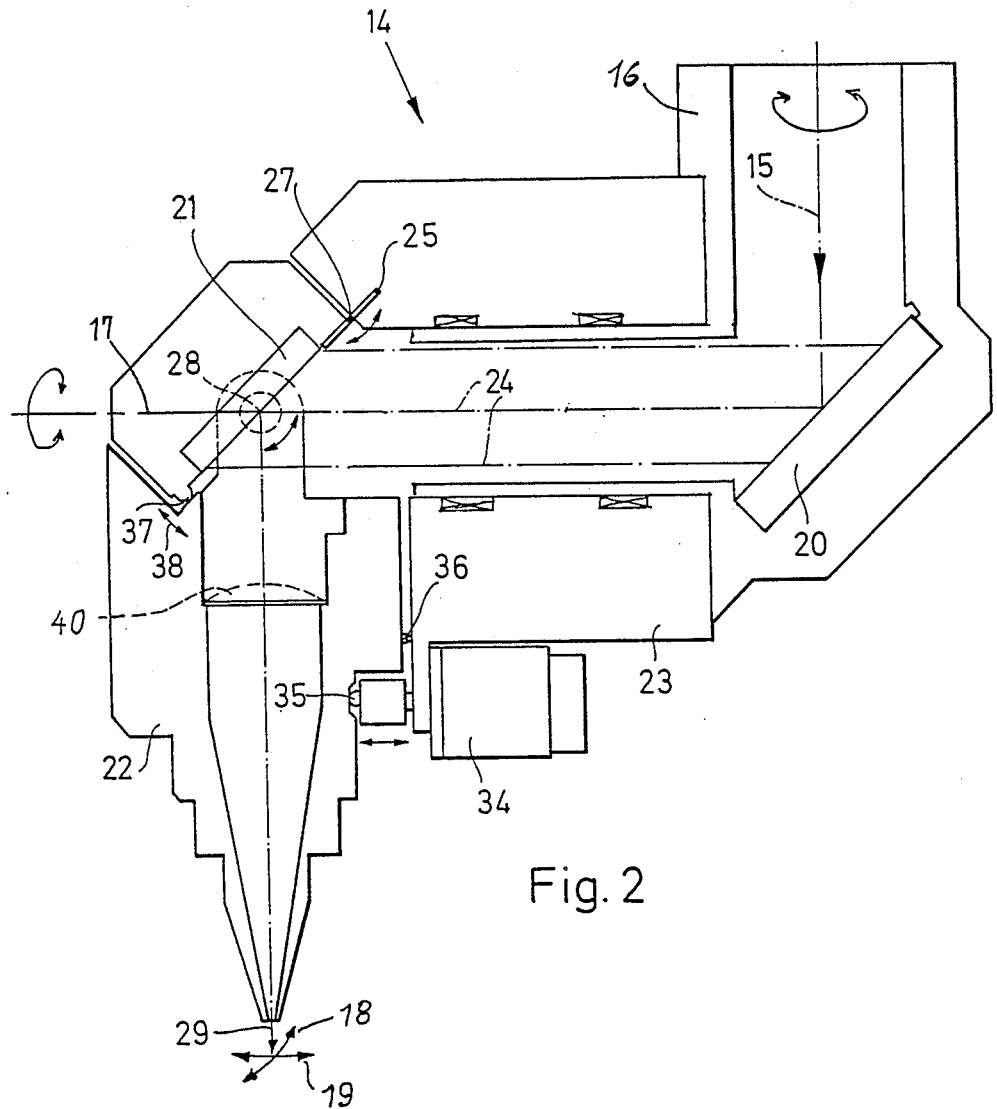
Figure 3:
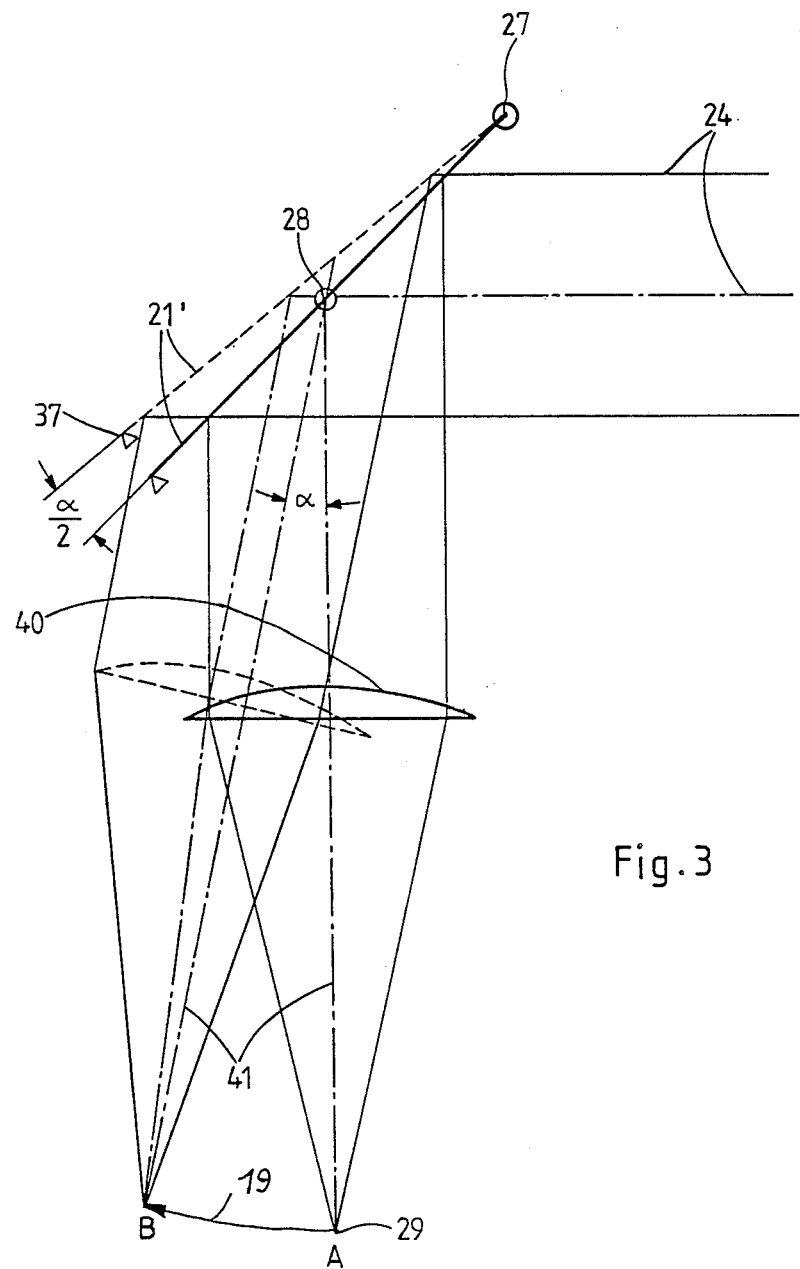

FIG. 1 shows a device for directing optical rays.
FIG. 2 shows a view of part of the device in detail.
FIG. 3 shows a detail of FIG. 2 in different positions of pivoting.

DETAILED ACCOUNT OF WORKING EXAMPLE OF THE INVENTION

FIG. 1 shows a device for directing optical rays as is for instance used in for welding or cutting operations and the like. The device 10 consists of a multipart frame with relatively moving frame parts 11 to 13, with which a ray deflecting device 14 may be moved in the X, Y and Z directions.

The rays, as for instance laser rays 14, are directed via the vertically shifting frame 13 into the deflecting device 14, where they are deflected, as will be seen from FIG. 2 in more detail, by a rigid deflecting mirror 20 and a pivoting deflecting mirror 21 so that the exit ray 29 is directed so as to be approximately parallel the input ray 15 while however being changed in position. The rigid mirror 20 is connected with a three-dimensionally movable housing 16 16. The deflecting device 14 furthermore comprises a rotary housing 23, which carries the moving mirror 21 and a ray exit member 22. The rotary housing 23 is furthermore provided with a threaded rod 34.

The components 21, 22 and 34 connected with the rotary housing 23 are mounted together with the housing 23 as a subassembly able to be moved around a first axis 17. The axis is in the ray path 24, which is incident into the moving mirror 21. The housing 23 may be turned with the associated components 21, 22 and 34 through 360°.

The ray exit member 22 is for its part able to be pivoted in relation to the rotary housing 23 around a second axis 28, which is perpendicular to the plane of the rays which are incident at the movable mirror 21 at 24 and reflected at 29. Lastly the mirror 21 is arranged so that it may be pivoted about a third axis 27 in relation to the rotary housing 23. The second and the third pivot axes 28 and 27, respectively, run parallel to each other and are in the reflecting surface of the mirror 21.

The moving mirror 21 is so attached to the moving housing 23 by means of a leaf spring 25 that it forms the third pivot axis 27 in the free line range of the leaf spring 25 between the housing 23 and the mirror 21. The leaf spring 25 simultaneously serves to provide a returning force for the mirror 12 so that the latter is always in engagement at the point of contact 37 on the ray exit member 22.

The threaded rod 34 has an abutment 35 resting on the ray exit member 22 and with the abutment the ray exit member 22 and, respectively the exit ray, may pivot in the arrowed direction 19. A return spring 36 has one end connected with the moving housing 23 and its other end is so connected with the ray exit member 22 that the latter is pressed by it against the abutment 35 of the threaded rod 34. In this design the pivoting motion is caused in one direction (counterclockwise in FIG. 2) by the pressure of the abutment 35, while the tension of the return spring 36 causes motion in the opposite direction (clockwise in FIG. 2), when the abutment 35 of the threaded rod 34 is pulled back accordingly. When the threaded rod 34 and, respectively, the precision threaded rod 34 is used it is possible to ensure exact displacement in the micron range.

Simultaneously with the pivoting motion of the ray exit member 22 the mirror 21 is also moved. This is simply due to the fact that there is an abutting contact 37 in the form of an abutment between the ray exit member 22 and the mirror 21. By way of this abutting contact 37 the ray exit member 22 transmits its motion to the mirror 21. The abutting contact 37-may be at a single point, over a certain area or along a line and it is in the same plane as is assumed by the second and third pivot axes 28 and 27, respectively. The second pivot axis 28 of the ray exit member 22 is placed exactly centrally between the contact abutment 37 and the third pivot axis 37 for the mirror. The consequence of this is that on pivoting motion of the ray exit member 22 the mirror 21 is entrained automatically through half the angle as is indicated in FIG. 3.

FIG. 3 shows two positions of the nozzle exit member 22 and thus of the mirror 21, only the ray path and the reflecting surface 21 of the mirror and furthermore one lens 40 of the ray exit member 22 being indicated. In the position marked in full lines of the reflecting layer 21' of the mirror 21 and of the lens 40 the parallel ray 29 impinges at a point A. By operation of the threaded rod 34 or lead screw the abutment 35 presses the ray exit member 22 through an angle of α (for instance) in the direction 19 to the left into the position marked in broken lines. Owing to the abutting contact 37 between the ray exit member 22 and the mirror 21 the reflecting layer 21' is moved out of the original position into the position marked in broken lines. Since the abutting contact 37 for the mirror 21 and the pivot axis 27 of the mirror is arranged at the same distance from the pivot axis 28 of the ray exit member 22, the reflecting layer 21' is only turned through the angle $\alpha/2$.

The reflected ray 29 then through the angle $\alpha$, i.e. it follows the motion of the ray exit member 22. The parallax produced by the pivoting motion noted above and due to the mirror being turned out of the central setting is of no effect, since the following lens 40 always collimates or directs the parallel incident rays onto the same point in relation to the lens axis 41.

This mechanism, in the case of which only a relatively small mass, namely the mass of the ray exit member 22 and of the mirror 21, has to be pivoted, makes is possible for the position of the working ray 29 to be changed precisely, that is to say with an accuracy in the micron range, in the direction 19. This pivoting motion 19 is used for correction of the position on moving the ray 29 along a line of working. Owing to the pivotability about the first axis 17 the output ray 29 may be swept in a direction 18, which is perpendicular to the direction 19. Thus there is the possibility, while still having the chance of positioning by way of the pivoting motion 19, to direct the ray 29 along corrugated or any other curved workpiece surfaces in such a manner that the ray 29 is always perpendicular to the respective surface element at which the ray is incident.

FIG. 1 of instance shows a workpiece 31, which has a flat zone 32 and adjoining rising zone 33. On directing the ray 29 along the flat weld seam 30 the rotary housing 23 is so set that the output ray 29 is aligned in the Z direction. This only involves a correcting pivot motion in the direction 19 as far as this should be necessary. When the ray 29 reaches the upwardly curved weld line in the zone 33 the housing 23 together with the ray exit member 22 and mirror 21 are so turned about the axis 17 that the output ray 29 is swept in the direction 18 (to the rear in terms of FIG. 1) to such an extent that the output ray 29 reaches the line normal to the respective point in the area at which the ray is incident.

The control of the pivoting motion may be automatic by having position sensors (not shown) placed at suitable positions and connected with the rod 34 by conventional automatic control means and a drive, not shown, for the rotary or turning motion of the housing 23.

In place of the plane mirror 21 and the following ray concentrating optical system 40 it is also possible to provide a concave mirror.

The embodiment of the invention shown in the drawings and described above serves for the continuous motion of the ray 29 along a line 30 curved in one plane, as is for instance shown in FIG. 1. It is however obviously possible to further develop the device by a further pivoting fixture as has been proposed in the prior art. The pivot axis for this additional pivoting motion is in the incident ray 15 of the rigid mirror 20. This additional possibility of motion, which means that the ray exit member 22 is moved in a circle perpendicular to the pivoting circle around the axis 17, makes it possible for the output ray 29 to be moved continuously and with the possibility of correction of position along any desired line in space without any need for the ray to be offset.

We claim:

1. A device for directing an optical ray comprising at least one deflecting mirror, a ray exit member adjoining said mirror, means for supporting said member for pivoting motion about first and second axes perpendicular to each other, the first of said axes being parallel to or coinciding with a ray incident on said deflecting mirror and said second axis being perpendicular thereto, said second pivot axis being in the reflecting surface of the mirror in a central setting of the ray exit member, and means for pivoting said mirror about a third axis with an angle of pivot equal to half the angle of pivot of the ray exit member, such third axis being parallel to the second pivot axis.

2. The device as claimed in claim 1 wherein the said third pivot axis is in the reflecting surface of the mirror.

3. The device a claimed in claim 1 comprising a housing adapted to be pivoted about the first pivot axis and a leaf spring attaching the mirror to the housing, said spring simultaneously defining the third pivot axis for the mirror.

4. The device as claimed in claim 1 comprising means defining an abutting contact between the ray exit member and the mirror, said abutting contact and the third pivot axis being placed symmetrically in relation to the second pivot axis.

5. The device as claimed in claim 1 comprising a housing adapted to be pivoted about the first pivot axis, a leaf spring attaching the mirror to the housing, said spring simultaneously defining the third pivot axis for the mirror, and means defining an abutting contact between the ray exit member and the mirror, said abutting contact and the third pivot axis being placed symmetrically in relation to the second pivot axis, said spring being so designed that it is able to urge the mirror against the ray exit member at the abutting contact.

6. The device as claimed in claim 1 comprising a threaded rod for causing pivoting motion about the second axis, said rod engaging the ray exit member.

7. The device as claimed in claim 6 wherein said threaded rod engages the ray exit member adjacent to a position of ray emergence from said member.

8. The device as claimed in claim 7 comprising a return spring urging the ray exit member against the threaded rod.

* * * * *